United States Patent
Stanevicius

(10) Patent No.: US 7,124,571 B2
(45) Date of Patent: Oct. 24, 2006

(54) ROTARY INTERNAL COMBUSTION ENGINE

(76) Inventor: Algimantas Aleksandras Stanevicius, Bispilio str. 26, Jurbarkas 4430 (LT)

( * ) Notice: Subject to any disclaimer, the term of this patent is extended or adjusted under 35 U.S.C. 154(b) by 0 days.

(21) Appl. No.: 10/479,636

(22) PCT Filed: Feb. 28, 2002

(86) PCT No.: PCT/LT02/00001

§ 371 (c)(1),
(2), (4) Date: Dec. 4, 2003

(87) PCT Pub. No.: WO03/072917

PCT Pub. Date: Sep. 4, 2003

(65) Prior Publication Data

US 2004/0154310 A1    Aug. 12, 2004

(51) Int. Cl.
*F02C 5/00* (2006.01)
(52) U.S. Cl. ........................ 60/39.39; 60/806
(58) Field of Classification Search ........ 60/39.34, 60/39.38, 39.39, 39.4, 804, 806
See application file for complete search history.

(56) References Cited

U.S. PATENT DOCUMENTS

| | | | | |
|---|---|---|---|---|
| 1,654,119 A | * | 12/1927 | Enders | 60/39.39 |
| 2,675,675 A | * | 4/1954 | Haueter | 60/39.39 |
| 2,928,242 A | * | 3/1960 | Guenther | 60/39.39 |
| 5,237,811 A | * | 8/1993 | Stockwell | 60/39.39 |

* cited by examiner

*Primary Examiner*—L. J. Casaregola
(74) *Attorney, Agent, or Firm*—Weiner & Burt, P.C.; Irving M. Weiner; Pamela S. Burt

(57) ABSTRACT

A rotary internal combustion engine with intermittent burning cycle, converting heat energy into the rotary motion, with a multi stage compression rotor (3) and centrifugally-axial air compression impellers (3.2), an air valve (5.1), which alternatively filling up the combustors (4.3) with the compressed air and closing them. A fuel pump (6) compresses fuel and through fuel distributor (6.1) supplies it to the combustors (4.3) to achieve combustion when sprinkled on the hot-red spirals of the ignition plugs (4.5). The gas generated in the combustors (4.3) passes through the cascade turbines (5.10; 5.3; 5.11), driving the power rotor (5) and through the coupling-gear (5.4) transferring rotary motion to a drive shaft (7). A hollow impeller (3.5), mounted onto the compression rotor (3), pumps air through a diffusor-shade (3.8) for cooling the compressor from the outside and the inside.

20 Claims, 4 Drawing Sheets

ROTARY INTERNAL COMBUSTION ENGINE

BACKGROUND OF THE INVENTION

This invention relates to gas turbine engines.

The gas turbine engines, known to the applicant, suffer from the following disadvantages:

1. These engines are not stable, because a gas with higher than 1000 degree C. temperature and a dust inflow with compressed air rapidly destroy high-speed power and compressor turbines. Therefore, for keeping low gas temperature there is a need to supply 3–4 times larger amount of air than it is needed for burning. Attempts to improve air filtering considerably increases the volume of the engine and energy consumption.

2. Low efficiency (only about 30%), because ⅔ of energy generating by the engine is being used for compressing required amount of air.

3. Thermal losses by cooling engine and with hot exhaust are 1.16 times higher than losses in a diesel engine.

4. Bad braking action that is unacceptable for automobiles.

In SU (Russia) patent No 293471 A1 a gas turbine engine is described comprising the low pressure axial and the high pressure centrifugal compressors, a combustor with continuous combustion cycle and cascade of free rotating gas turbines. The first turbine drives a centrifugal compressor, second and third turbines drive an axial compressor and fourth and fifth turbines rotate a drive shaft only. This engine has no brake action and has all aforesaid disadvantages.

In SU patent No 1792122 A1 a gas turbine engine is described comprising a ventilator, a centrifugal compressor combined with a gas turbine, a combustor, a power turbine, a heat exchanger and a refrigerator. A ventilator drives part of air for compression, the rest part of air goes through the refrigerator, where high pressure gas is cooled and where from is ejected through the ejector, air is mixing with a gas and driving to the compressor. The heat exchanger heats the compressed air-gas mixture and supplies it to the combustor for burning. The gas pressure, resulting from the burning process, drives the turbine combined with the compressor. Part of gas flows through the heat exchanger heating it, and then flows through the refrigerator, where it cools and is ejected to the air going to the compressor; another part of gas drives the power turbine, then flows through the heat exchanger and is exhausted. This engine requires a large amount of energy for air compression, because of the gas going through the combined turbine and heating said compressor that compresses hot air-gas mixture. This engine has undesirable heat and energy losses, when high pressure gas is cooled in the refrigerator.

OBJECT OF THE INVENTION

The main object of the present invention is to provide a rotary internal combustion engine with intermittent combustion cycle in the closed combustors that permits to keep higher gas temperature and higher pressure considerably increasing an engine efficiency. Another object of the invention is to provide a rotary internal combustion engine comprising a small compressor, capable to filter air efficiently and compress it by help of centrifugal forces, driving air into axial direction. Also—to provide a compressor capable to cool air from the beginning till the end of compression cycle, thereby considerably reducing consumption of energy for air compression. A further object of the invention is to provide a system converting the fuel to a gas that improves fuel mixing with air; thereby it improves the combustion process and reduces CO and NO in the exhaust. Another further object is to provide a stable engine with good brake action without using any additional devices. Summarizing the main purpose of the invention is to provide said engine with 1.5–2 times higher efficiency, which applicant believes to achieve, than all known engines and to eliminate aforementioned disadvantages.

SUMMARY OF THE INVENTION

The above noted objects are accomplished by the provided rotary internal combustion engine comprising a power body with four pear configuration combustors whose exhaust ports are directed to rotational direction of the cascade intermittent turbines, located on the power rotor in to semicircular gas flow direction. A power rotor rotates between a power housing with stationary impeller blades inside and a power body joined by bolts. Said power housing is joined by bolts with a compressor having inertial air filtering and cooling, by help of the hollow impeller, mounted onto the compression rotor, also comprising a barrier air filter, located between the stabilizer spokes.

The efficient air compression is accomplished by the multi-stage compression rotor comprising the specially configured centrifugal-axial air driving impellers that rotate between stationary impellers inside of the compressor housing. This arrangement considerably decreases energy consumption for air compression and it takes less space than conventional centrifugal compressors.

An intermittent combustion of the engine is accomplished by closing the combustors with an air valve from air inflow side and with the power rotor from the gas exhaust side. For this purpose the adjacent turbine on the power rotor is accomplished as a range of a ring located holes with two breaks positioned across the rotor, where these breaks close the combustors from the exhaust side.

A fuel pump with a fuel distributor located on the top of the power body supplies fuel to the combustors intermittently and at definite time.

An intermittent combustion cycle in the closed combustors and intermittent gas effect on the turbine blades permit 2–2.5 times to decrease amount of air supplied for combustion comparable with prototypes, and permit to rise gas temperature from 1000 degrees up to 1700 degrees C., that considerably improves efficiency of the engine.

The fuel heating by exhausted gas in the fuel heaters located in the exhaust ports, permits to convert fuel to a gas (in a moment of evaporating), when sprayed with highly compressed hot fuel to less compressed hot air at the combustors. An air mixes better with the gas than with small drops of fuel. This arrangement substantially improves combustion and reduces harmful amount of NO and CO in the exhaust.

According to the invention durability of the engine will be assured by sufficient inertial and barrier air filtering, by the intermittent gas effect to the turbine blades that cools them, and by using strong aluminum alloys for the compressor parts and using ceramics or high temperature proofed steel for power system parts.

According to the invention this engine has a good brake action, due to drive shaft connected through the transmission system to the power rotor and compressor without any additional devices such as guide wanes and others devises used in conventional gas turbine engines.

According to the invention low energy consumption for air compression, good heat exchanging process by covering the combustors and the gas stream channels with the compressed air supply channels, heat saving by covering power housing and power body with thermal isolation, an intermittent combustion process in the closed combustors that permits considerably to rise gas temperature, and fuel converting to a gas allows to expect that the rotary combustion engine will be at least 1.5–2 times higher efficiency comparable with prototypes.

BRIEF DESCRIPTION OF THE DRAWINGS

The invention will be described by presenting sample of engine with reference to the accompanying drawings wherein.

DESCRIPTION OF THE PREFERED EMBODIMENTS

In FIGS. 1 to 5 there is alone embodiment of a rotary internal combustion engine according to the invention and designated by the reference.

Figure 1:
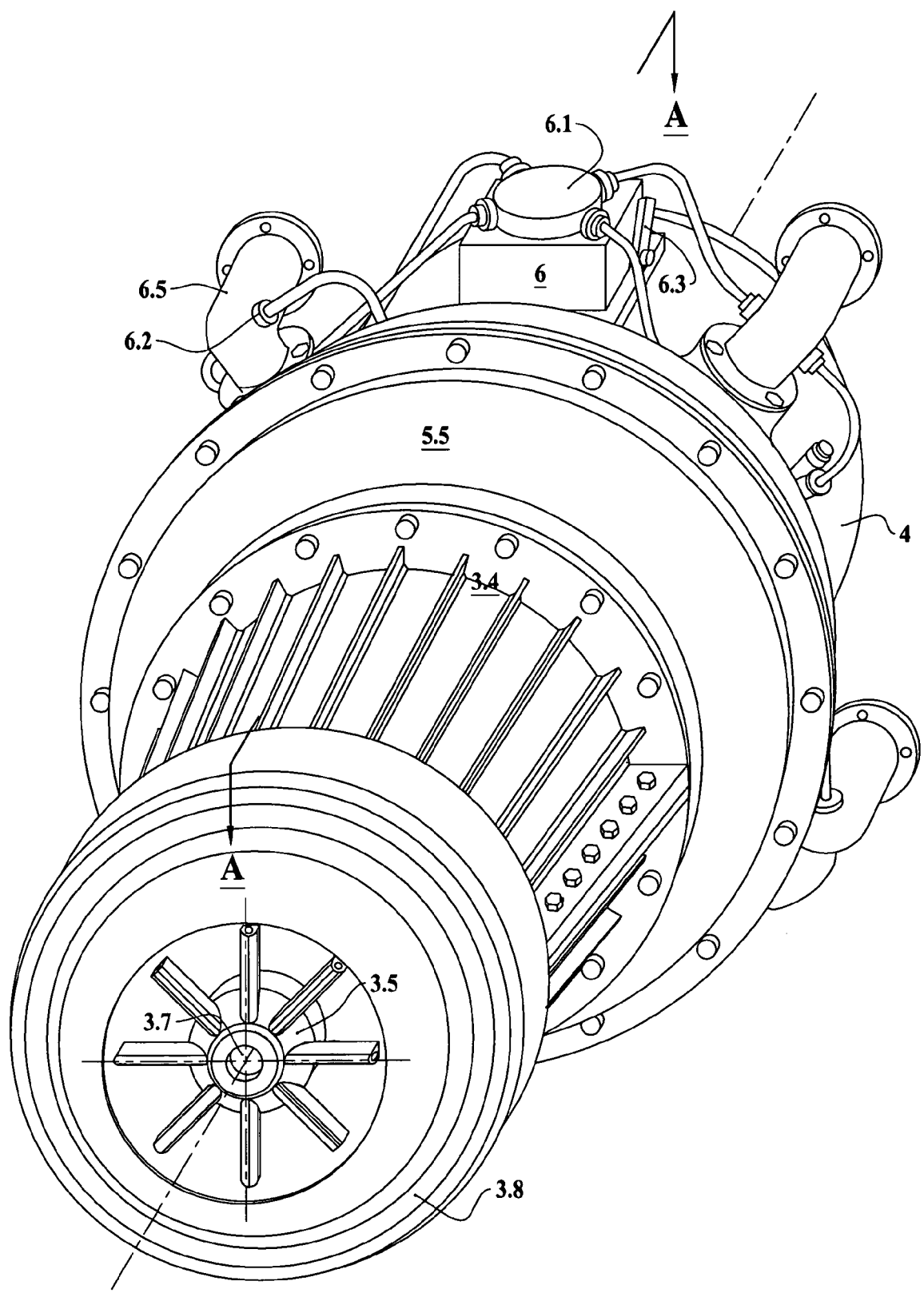
FIG. 1 is a perspective view of a rotary internal combustion engine according to the invention.
Figure 2:
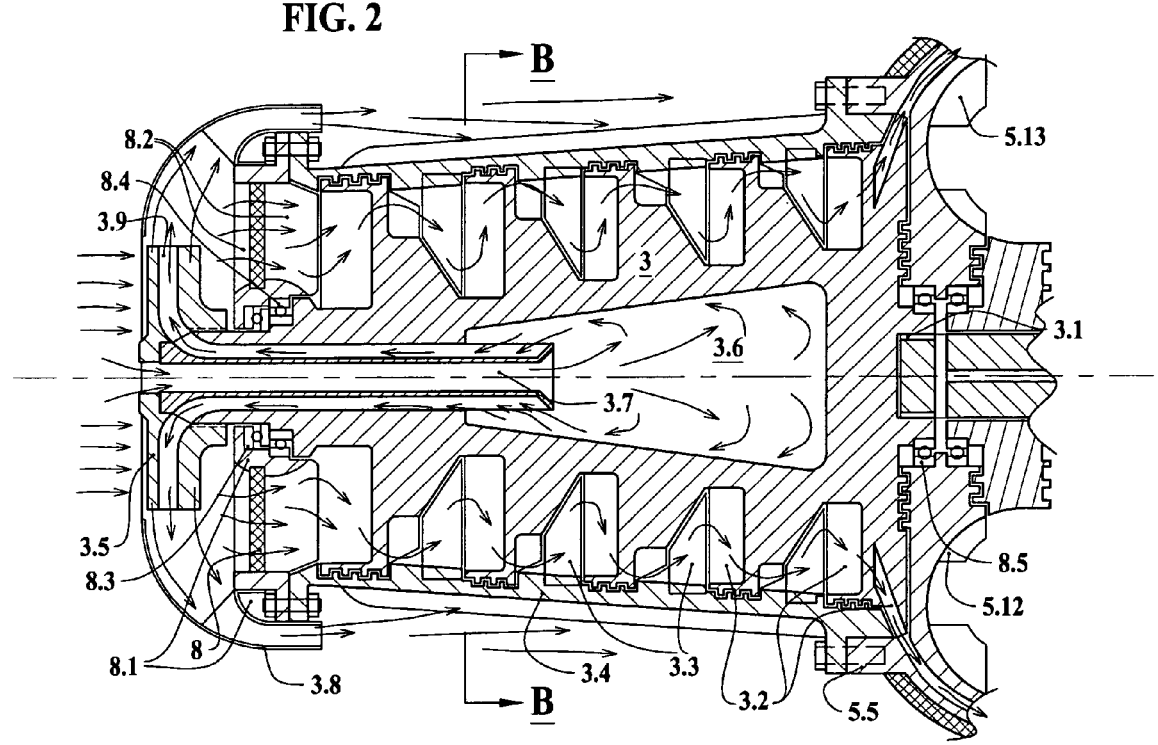
FIG. 2 according to the FIG. 1 here is a longitudinal section of a compressor on line A.

A hollow impeller 3.5 as shown in FIG. 1 and FIG. 2 consists of the blades, that are twisted so that blades driving air into axial direction by the centrifugal force would throw out heavier than air fractions as dust. Air required for compressor cooling, carrying dust, is directed by a diffuser-shade 3.8 along the cooling blades on the compressor housing 3.4. At the same time said hollow impeller 3.5 with channels in the blades 3.9 sucks air through the outer channels of a cross-pipe 3.7 from the emptiness 3.6, generating vacuum inside of the compression rotor 3. Said hollow impeller 3.5 is mounted onto the front end of the compression rotor 3 so, that channels 3.9 in the blades are joined with the outer channels of a cross-pipe 3.7 located in the center of said compression rotor 3. Ambient air flows through the central channel of a cross-pipe 3.7 to vacuum and instantly expanding in the emptiness 3.6, due to adiabatic process chills inside of the compression rotor 3. A cross-sectional area of the central channel on the cross-pipe 3.7 being smaller than a total of cross sectional areas of all outer channels on said cross-pipe. Thereby the hollow impeller 3.5 separates and throws out carrying dust air cooling the compressor from the outside, chilling it from the inside and drives inertly filtered air through the barrier filter 8 for compression.

Figure 3:
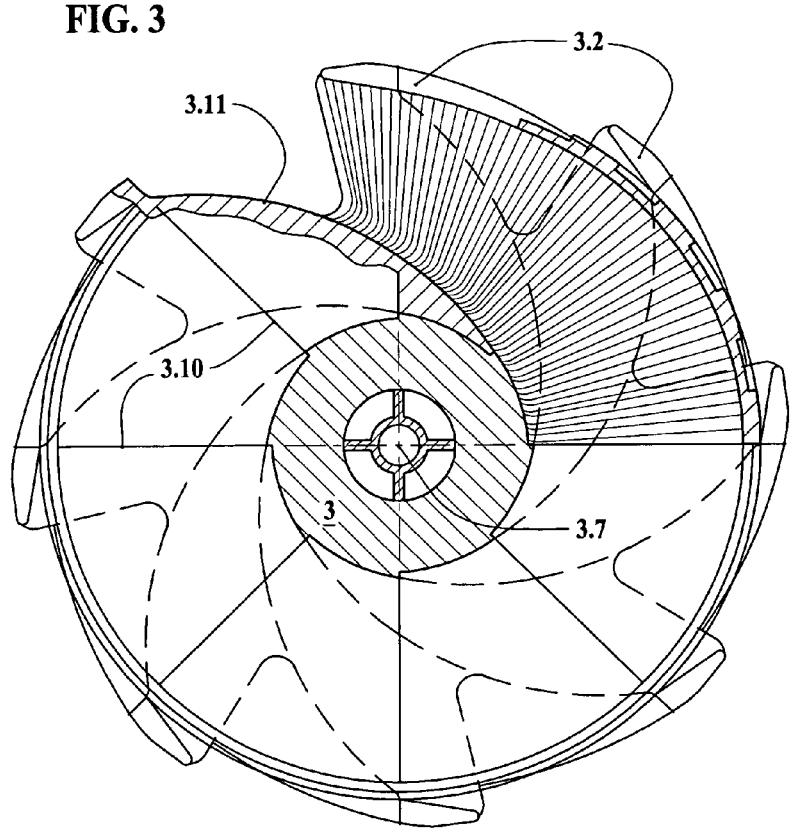
FIG. 3 according to the FIG. 2 here is a cross-section of the compression rotor on line B.

The front end of the multi-stage compression rotor 3 is mounted through the basic 8.3 and simple 8.4 bearings into the stabilizer 8.1, opposite end is mounted through the bearing 8.5 into the power housing 5.5, also through a teeth connection 3.1 it is joined with a central shaft 2. Said compression rotor 3 comprises particularly configured compression impellers 3.2 as shown in FIG. 2 and FIG. 3 having twisted wide blades whose beginnings are girdled with rings comprising a labyrinth seal, whose ends are open and have an increasing diameter at the end. A bottom of the channel between said adjacent blades is accomplished as the centrifugal impeller blades. Therefore the impeller captures air with full diameter of axial compressor blades 3.10 and throws out with centrifugal impeller blades 3.11, driving air into axial but not into radial direction. Thereby an axial drive of air will be intensified by the centrifugal force without dangerous vibration of blades. It permits to reach higher compression ratio with lower rotational speed and lower consumption of energy. The compression impellers 3.2 rotate between the stationary impellers 3.3 that brake air rotation and direct the air flow for the best air capture to sequential step of rotating compression impellers 3.2. The stationary impellers 3.3 are located inside the compressor housing 3.4, which has the longitudinal cooling blades on the outside and two its parts are joined by bolts along. A compressor housing 3.4 by bolts is joined to the power housing 5.5, opposed end is joined with the stabilizer 8.1. The stabilizer spokes 8.2 brake the air rotation. Barrier filter 8 located between the stabilizer spokes finally filters air. A diffuser-shade 3.8 is fixed on the outer side of stabilizer 8.1 that through the basic bearing 8.3 and bearing 8.4 joins the compression rotor 3 with the compressor housing 3.4.

Figure 4:
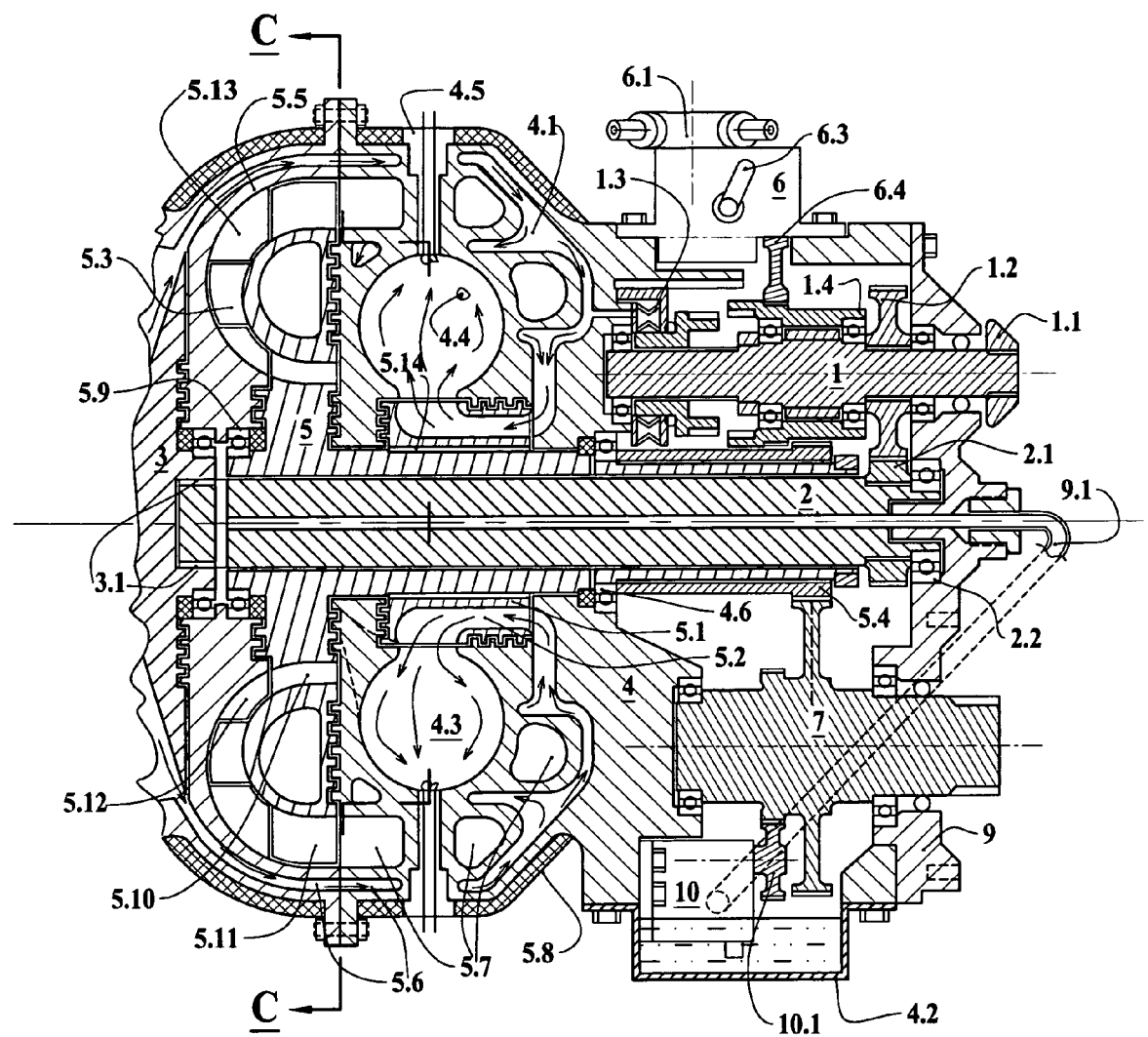
FIG. 4 according to the FIG. 1 here is a longitudinal section of the power and transmission systems of the engine on line A.
Figure 5:
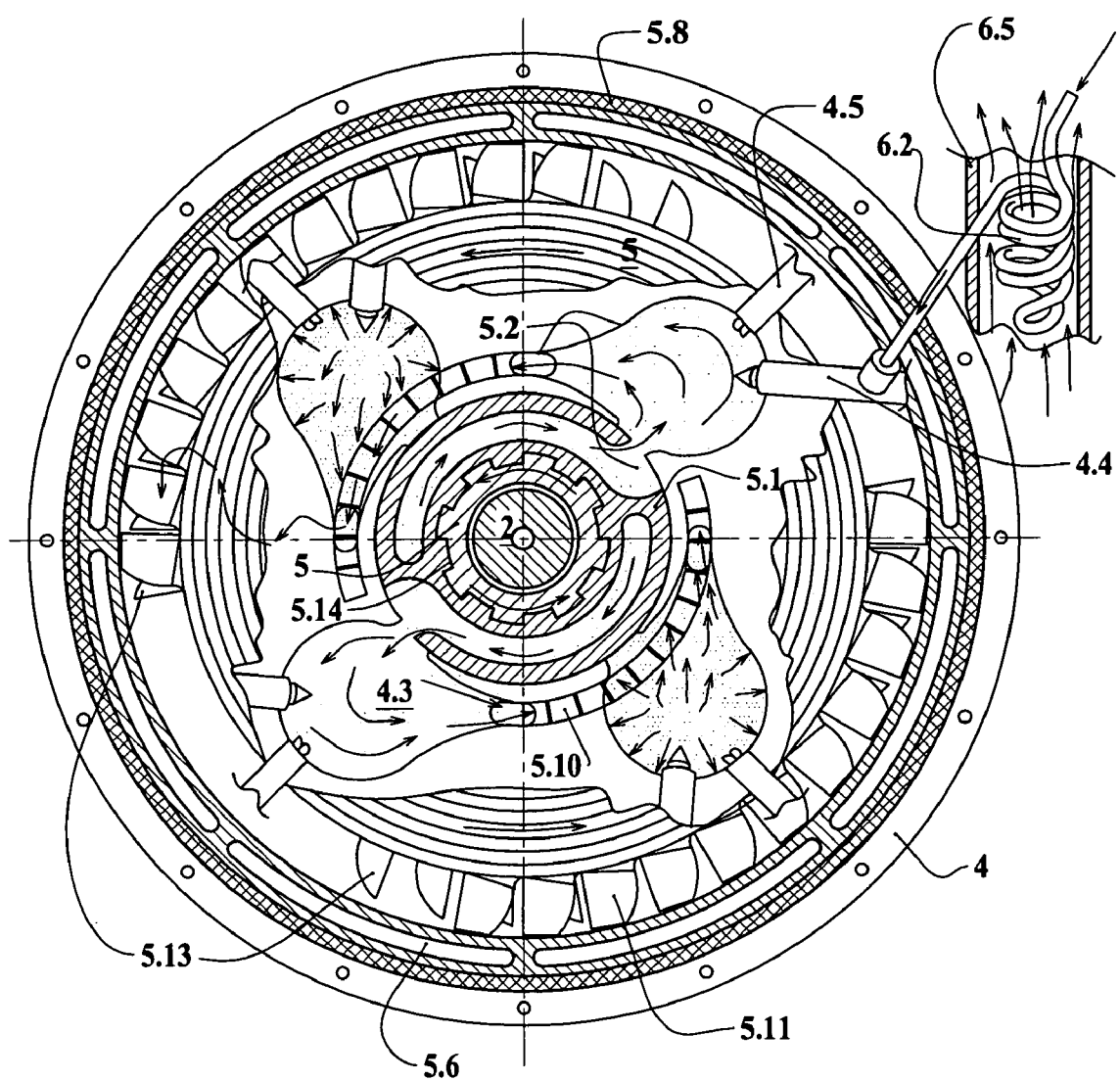
FIG. 5 according to the FIG. 4 here is a schematic section of a power system on line C with gas flow through the turbines trajectory.

The compressor supplies filtered and compressed air to the system generating power. Compressed air goes through the air flow channels 5.6 in the power housing 5.5 as shown in FIG. 4 and through the channels 4.1 in the power body 4 so, that those channels cover the combustors 4.3 and the gas stream channels 5.7 from all sides. Thereby air cools the hot parts of the engine and takes heat from the exhaust. To reduce noise the gas stream channels 5.7 are designed as a muffler, also said power housing 5.5 and said power body 4 from the outside are covered with thermal isolation 5.8, that holds up some heat, reducing the noise. A hot air flows to the air valve 5.1, which is mounted by a teeth connection 5.14 onto the power rotor 5. This valve 5.1 opens and closes the combustors 4.3 and through the intake channels 5.2 as shown in FIG. 5, fills up the combustors 4.3 with hot air. The power body 4 comprises pear configuration four combustors 4.3, with the least angle directed to rotational direction of the intermittent turbine 5.10. The combustors 4.3 work intermittently, two ones are firing while the other two are cooling. The engine could function with only two or three combustors but it would reduce engine power and generate undesirable vibration. The fuel nozzles 4.4 and ignition plugs 4.5 are attached to the combustors 4.3 through the holes in a power body 4. Combustion occurs in the combustors 4.3 when sprayed with fuel through the nozzles 4.4 to the compressed hot air. Starting the engine while supplied air has got low temperature there is a need for initial ignition to use the ignition plugs 4.5, that will be turned off after the engine starts. Further combustion in the combustors 4.3 will be assured when sprayed with fuel in the state of gas to the hot air and can be done by transferring flame through the specially drilled channels in the air valve 5.1 so that said channels would open cyclically from the combustors with burning gas to the combustors with sprayed fuel.

The gas pressure resulting from the burning process in the combustors 4.3 drives the power rotor 5, which rotates in the chamber, formed between the power body 4 and the power housing 5.5 joined by bolts. Said power rotor 5 rotates on the bearings 5.9 and 4.6, mounted to said power housing 5.5 and said power body 4. The solid power rotor 5 comprises a cascade of intermittent turbines 5.10; 5.3; 5.11, that are located in a semicircle along gas stream direction, where the energy of expanding gas with the least heat loses is converted to mechanical-rotation. The first step of turbine is formed as a range of holes 5.10 as shown in FIG. 5 that are going across the power rotor 5 and positioned within a ring with two breaks, which is needed for closing the combustors 4.3. The gas stream after passing said holes 5.10 goes through the stationary impeller 5.12 on the power housing 5.5, then pushes the blades 5.3 on the torus configuration side of the power rotor 5. Then the gas flows through the stationary impeller 5.13 and pushes the blades 5.11 on the edge of the power rotor 5. Then the gas stream flows through the channels 5.7 heating compressed air in the power body 4 and heating the fuel in the fuel heaters 6.2 located inside of the exhaust ports 6.5. The fuel heaters 6.2 are made from the high temperature and chemical proofed pipes in spiral or another configuration. When highly compressed and hot fuel is sprayed into the combustor with lower compression hot air the fuel instantly evaporates converting to a gas. It improves fuel mixing with air and assures better combustion, reducing harmful CO and NO in the exhaust. More heat is saved by heating air and fuel with the exhaust and by isolating hot surfaces of the engine. This arrangement increases efficiency of the engine.

A fuel pump 6 as shown in FIG. 1 and FIG. 4, located on the top of the power body 4, generates high fuel compression, where through the opened acceleration valve 6.3 fuel moves in a circle in the inside of fuel pump 6. by keeping minimal pressure in the fuel supply system. Pressure in the system increases when said valve 6.3 is turned for opening. When pressure in the system exceeds level required, the fuel is sprayed through the nozzles 4.4 into the combustors 4.3. The engine achieves fast acceleration by turning said acceleration valve 6.3 that increases pressure in the system and sprayed more fuel into the combustors 4.3. To ensure intermittent work of the combustors 4.3 there is a fuel distributor 6.1 located on the fuel pump 6. and directing fuel to combustors at the definite time through the two fuel heaters 6.2, while another two are waiting.

For assuring a proper engine operation a power transmission system is located in the emptiness of the power body 4. closed by a cap 9. A starter shaft 1 through the gears 1.2 and 2.1 rotates the central shaft 2, which through a teeth connection 3.1 is joined with the compression rotor 3. Thereby a starter, rotating the starter shaft 1 through the gear 1.1, rotates the compression rotor 3 and supplies compressed air to the power system. As pressure reaches required level air pushes a pneumatic coupling 1.3 connecting by a teeth connection the starter shaft 1 with the coupling-gear 1.4, which freely rotates on the starter shaft 1. The coupling-gear 1.4 rotates the fuel pump gear 6.4 and the coupling gear 5.4 that by a teeth connection is mounted onto the power rotor 5. The coupling-gear 5.4 rotates the drive shaft 7, which rotates an oil pump gear 10.1.

One end of the starter shaft 1 and one end of drive shaft 7 through the bearings are mounted to the power body 4, other ends are mounted to the cap 9. One end of the central shaft 2 through a teeth connection 3.1 is mounted into the compression rotor 3, other end through the bearing 2.2 is mounted to the cap 9.

A carter 4.2, which accumulates the oil flowed down from the bearings and gears, is attached to the power body 4 closing an emptiness from the bottom. An oil pump 10 supplies oil from the carter 4.2, through the oil pipe 9.1 attached to a cap 9, through a central shaft 2 for lubricating and cooling the bearings 5.9; 4.6 on the power rotor 5. oil pressure is kept equivalent to air pressure in the power system. It permits to lubricate the sealing rings at the bearings and to avoid of air penetration to the bearings or oil penetration to the air. To reduce penetration of the compressed air to the gas or the other way round the labyrinth packers are formed on the power rotor 5 and on the air valve 5.1, also pressure of compressed air from one side is approximately equivalent to the pressure of the burning gas from another side.

The invention claimed is:

1. A rotary internal combustion engine, comprising:
   a power rotor (5) with cascade turbines (5.10, 5.3, 5.11) rotating between a power housing (5.5) with stationary impellers (5.12, 5.13) and a power body (4) with four pear-shaped combustors (4.3) and air supply (4.1) and gas stream (5.7) channels disposed within said power body (4);
   a multi-stage compressor having a compression rotor (3) with centrifugally-axial air pumping impellers (3.2), a hollow impeller (3.5), and a barrier filter (8);
   an air valve (5.1) with air supply channels (5.2) and flame transfer channels being mounted onto a hub of said power rotor (5) by way of a teeth connection (5.14);
   a fuel pump (6) with a fuel distributor (6.1);
   fuel heaters (6.2) located in exhaust ports (6.5);
   a power transmission system having a central shaft (2) freely rotating in said hub of said power rotor (5);
   a drive shaft (7) with an oil pump rotating gear (10.1);
   a starter shaft (1) with gears (1.1, 1.2);
   a pneumatic connector (1.3);
   a freely-rotating coupling gear (1.4);
   said combustors (4.3) being cyclically fully closed by rotation of said power rotor (5) and said air inlet valve (5.1);
   a flame transfers from a combustor with burning gas to an adjacent combustor having fuel sprinkled therein;
   said sprinkled fuel instantly converts to a gas in said adjacent combustor;
   said hollow impeller (3.5) inertly filters and cools passing air by cooling compression rotor (3) from the inside and compressor housing (3.4) from the outside; and
   said drive shaft (7) is continuously joined with said power rotor (5) by means of a coupling gear (5.4).

2. An engine according to claim 1, wherein:
   said air valve (5.1) fills said combustors (4.3) with compressed air and contactlessly closes an inlet of said combustors (4.3);
   said air valve (5.1) is formed as coupling comprising two semicircular axially-opened air supply channels (5.2), whose depth increases in the direction of radially opened outlet holes;
   for contactlessly closing an outlet of said combustors (4.3) and for ensuring closing time required for efficient filling up of said combustors (4.3) with compressed air and for spraying with fuel and ignition, a turbine (5.10) is formed on said power rotor (5) as a range of holes positioned within a ring with two breaks.

3. An engine according to claim 1, wherein:
   for obtaining the best torsion on said power rotor (5), said pear-shaped combustors (4.3) have a radial inlet and are set perpendicular to a radius with least angle of gas flow to rotational plane of said turbine; and
   other turbines are located on said power rotor (5) in a semicircular gas flow direction so that gas flow passing a turbine (5.10) and passing the stationary impeller (5.12) will rotate a turbine (5.3) and passing said stationary impeller (5.13) will rotate said turbine (5.11).

4. An engine according to claim 2, wherein:
   for obtaining the best torsion on said power rotor (5), said pear-shaped combustors (4.3) have a radial inlet and are set perpendicular to a radius with least angle of gas flow to rotational plane of said turbine; and other turbines are located on said power rotor (5) in a semicircular gas flow direction so that gas flow passing a turbine (5.10) and passing the stationary impeller (5.12) will rotate a turbine (5.3) and passing said stationary impeller (5.13) will rotate said turbine (5.11).

5. An engine according to claim 2, wherein:
for efficient heat consumption, heat is taken from an exhaust and from cooling hot parts and conveyed back to said compressed air supplied for burning;
air supply channels (5.6) and (4.1) located in said power housing (5.5) and said power body (4) are formed so the gas stream channels and said combustors (4.3) are covered from all sides; and
the hot outer surface of said power housing (5.5) and said power body (4) is covered with a thermal insulation (5.8).

6. An engine according to claim 4, wherein:
for efficient heat consumption, heat is taken from an exhaust and from cooling hot parts and conveyed back to said compressed air supplied for burning;
air supply channels (5.6) and (4.1) located in said power housing (5.5) and said power body (4) are formed so the gas stream channels and said combustors (4.3) are covered from all sides; and
the hot outer surface of said power housing (5.5) and said power body (4) is covered with a thermal insulation (5.8).

7. An engine according to claim 1, wherein:
for better consumption of heat and for improvement of the burning process in said combustors (4.3), said fuel heaters (6.2) are formed as pipes in a spiral or other predetermined configuration located inside of said exhaust ports (6.5).

8. An engine according to claim 1, wherein:
for efficient heat consumption, heat is taken from an exhaust and from cooling hot parts and conveyed back to said compressed air supplied for burning;
air supply channels (5.6) and (4.1) located in said power housing (5.5) and said power body (4) are formed so the gas stream channels and said combustors (4.3) are covered from all sides; and
the hot outer surface of said power housing (5.5) and said power body (4) is covered with a thermal insulation (5.8).

9. An engine according to claim 1, wherein:
for ensuring continuous ignition in said combustors (4.3), two flame transfer channels are drilled through said air valve (5.1) at predetermined locations.

10. An engine according to claim 2, wherein:
for ensuring continuous ignition in said combustors (4.3), two flame transfer channels are drilled through said air valve (5.1) at predetermined locations.

11. An engine according to claim 1, wherein:
for decreasing air turbulence and for eliminating dangerous vibration of blades, said centrifugally-axial air pumping impellers (3.2) are fabricated on said compression rotor (3) and comprise turned wide blades, whose beginnings from an outer side are girdled with rings comprising a labyrinth seal, and whose ends are open and have an increasing diameter at said ends, and
a channel bottom between said adjacent blades (3.10) is formed as centrifugal impeller blades (3.11).

12. An engine according to claim 1, wherein:
said central shaft (2) is provided with a central shaft gear (2.1);
said starter shaft (1) rotates said central shaft (2) by way of said starter shaft gear (1.2) and said central shaft gear (2.1), which in turn is joined with said compression rotor (3) through a teeth connection (3.1); and
said power rotor (5) is joined with said starter shaft (1) through said pneumatic connector (1.3) and said freely-rotating coupling gear (1.4).

13. An engine according to claim 2, wherein:
said central shaft (2) is provided with a central shaft gear (2.1);
said starter shaft (1) rotates said central shaft (2) by way of said starter shaft gear (1.2) and said central shaft gear (2.1), which in turn is joined with said compression rotor (3) through a teeth connection (3.1); and
said power rotor (5) is joined with said starter shaft (1) through said pneumatic connector (1.3) and said freely-rotating coupling gear (1.4).

14. An engine according to claim 11, wherein:
said central shaft (2) is provided with a central shaft gear (2.1);
said starter shaft (1) rotates said central shaft (2) by way of said starter shaft gear (1.2) and said central shaft gear (2.1), which in turn is joined with said compression rotor (3) through a teeth connection (3.1); and
said power rotor (5) is joined with said starter shaft (1) through said pneumatic connector (1.3) and said freely-rotating coupling gear (1.4).

15. An engine according to claim 1, wherein:
to decrease consumption of energy for air compression and to ensure inwardly adiabatic refrigeration of said compression rotor (3), said hollow impeller (3.5) is mounted onto a front end of said compression rotor (3);
channels (3.9) on said hollow impeller (3.5) are joined to outer channels of a cross-pipe (3.7) having opposite ends joined to a space (3.6) fabricated inside of said compression rotor (3);
a cross-sectional area of a central channel said cross pipe (3.7) being smaller than a total of cross-sectional areas of said outer channels of said cross pipe (3.7); and
for cooling said compressor from outside with air thrown out with dust by said hollow impeller (3.5), a diffusor-shade (3.8) is mounted onto a stabilizer (8.1).

16. An engine according to claim 11, wherein:
to decrease consumption of energy for air compression and to ensure inwardly adiabatic refrigeration of said compression rotor (3), said hollow impeller (3.5) is mounted onto a front end of said compression rotor (3);
channels (3.9) on said hollow impeller (3.5) are joined to outer channels of a cross-pipe (3.7) having opposite ends joined to a space (3.6) fabricated inside of said compression rotor (3);
a cross-sectional area of a central channel said cross pipe (3.7) being smaller than a total of cross-sectional areas of said outer channels of said cross pipe (3.7); and
for cooling said compressor from outside with air thrown out with dust by said hollow impeller (3.5), a diffusor-shade (3.8) is mounted onto a stabilizer (8.1).

17. An engine according to claim 15, wherein:
for air inertial filtering, the blades of said hollow impeller (3.5) are turned so that pumping air for compression heavy fractions as dust will be thrown out through said diffusor-shade (3.8); and for air barrier filtering, there are provided barrier filters (8) set between adjacent spokes (8.2) of said stabilizer (8.1).

18. An engine according to claim 3, wherein:

for efficient heat consumption, heat is taken from an exhaust and from cooling hot parts and conveyed back to said compressed air supplied for burning;

air supply channels (5.6) and (4.1) located in said power housing (5.5) and said power body (4) are formed so the gas stream channels and said combustors (4.3) are covered from all sides; and the hot outer surface of said power housing (5.5) and said power body (4) is covered with a thermal insulation (5.8).

19. An engine according to claim 1, wherein:

for air inertial filtering, the blades of said hollow impeller (3.5) are turned so that pumping air for compression heavy fractions as dust will be thrown out through said diffusor-shade (3.8); and for air barrier filtering, there are provided barrier filters (8) set between adjacent spokes (8.2) of said stabilizer (8.1).

20. An engine according to claim 16, wherein:

for air inertial filtering, the blades of said hollow impeller (3.5) are turned so that pumping air for compression heavy fractions as dust will be thrown out through said diffusor-shade (3.8); and for air barrier filtering, there are provided barrier filters (8) set between adjacent spokes (8.2) of said stabilizer (8.1).

* * * * *